US009452756B2

(12) United States Patent
Yokokawa et al.

(10) Patent No.: US 9,452,756 B2
(45) Date of Patent: Sep. 27, 2016

(54) VEHICLE CONTROL SYSTEM

(75) Inventors: Takahiro Yokokawa, Susono (JP); Yoshio Itou, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 163 days.

(21) Appl. No.: 14/239,743

(22) PCT Filed: Aug. 29, 2011

(86) PCT No.: PCT/JP2011/069444
§ 371 (c)(1),
(2), (4) Date: Feb. 19, 2014

(87) PCT Pub. No.: WO2013/030921
PCT Pub. Date: Mar. 7, 2013

(65) Prior Publication Data
US 2014/0200781 A1    Jul. 17, 2014

(51) Int. Cl.
| | | |
|---|---|---|
| B60W 10/02 | (2006.01) | |
| B60W 10/06 | (2006.01) | |
| B60W 30/18 | (2012.01) | |
| F16D 48/06 | (2006.01) | |
| B60W 10/26 | (2006.01) | |
| B60W 10/30 | (2006.01) | |

(52) U.S. Cl.
CPC ............. *B60W 30/18* (2013.01); *B60W 10/02* (2013.01); *B60W 10/06* (2013.01); *B60W 10/26* (2013.01); *B60W 10/30* (2013.01); *F16D 48/06* (2013.01); *B60Y 2300/18083* (2013.01); *F16D 2500/3061* (2013.01); *F16D 2500/30401* (2013.01); *F16D 2500/3108* (2013.01)

(58) Field of Classification Search
None
See application file for complete search history.

(56) References Cited

U.S. PATENT DOCUMENTS

| | | | | |
|---|---|---|---|---|
| 5,993,351 A | * | 11/1999 | Deguchi et al. | 477/5 |
| 8,727,938 B2 | * | 5/2014 | Nozaki | 477/5 |
| 2003/0060330 A1 | | 3/2003 | Sato et al. | |
| 2009/0048050 A1 | | 2/2009 | Kamada et al. | |

FOREIGN PATENT DOCUMENTS

| | | |
|---|---|---|
| DE | 112006000524 T5 | 4/2008 |
| JP | S64-009037 A | 1/1989 |
| JP | 2000-142178 A | 5/2000 |
| JP | 2000-170894 A | 6/2000 |
| JP | 2003-97696 A | 4/2003 |
| JP | 2005-325805 A | 11/2005 |
| JP | 2006-087274 A | 3/2006 |
| JP | 2006-273305 A | 10/2006 |
| JP | 2008-149907 A | 7/2008 |

* cited by examiner

Primary Examiner — Terry Chau
(74) Attorney, Agent, or Firm — Kenyon & Kenyon LLP (57) ABSTRACT

A vehicle control system includes an internal combustion engine capable of switching an operating state and a non-operating state while a vehicle travels, an engaging device capable of switching an engaged state in which the internal combustion engine is engaged with a driving wheel so that a power can be transmitted therebetween and a release state in which the engagement is released, and a controller configured to control the internal combustion engine and the engaging device based on a vehicle speed parameter as to a traveling speed of the vehicle and a determination parameter different from the vehicle speed parameter, place the engaging device in a release state at the time stop permission conditions of the internal combustion engine as to the determination parameter have been established while the vehicle travels at deceleration.

7 Claims, 6 Drawing Sheets

VEHICLE CONTROL SYSTEM

CROSS-REFERENCE TO RELATED APPLICATIONS

This is a national phase application based on the PCT International Patent Application No. PCT/JP2011/069444, filed on Aug. 29, 2011, the entire contents of which is incorporated herein by reference.

FIELD

The present invention relates to a vehicle control system.

BACKGROUND

As a conventional vehicle control system for improving the fuel economy of a vehicle, for example, Patent Literature 1 discloses a controller of a power train having an engine, a friction-engaging device that is engaged/released to control the torque transmitted from the engine to a wheel, and a hydraulic pressure source that is driven by the power of the engine and generates the source pressure of the hydraulic pressure acting on the friction-engaging device. The controller of the power train can automatically change the engine from an operating state to a stopped state based on a predetermined condition.

CITATION LIST

Patent Literature

Patent Literature 1: Japanese Patent Application Laid-open No. 2000-170894

SUMMARY

Technical Problem

Incidentally, although the controller of the power train described in Patent Literature 1 suppresses the shock generated by automatically stopping the engine by reducing the hydraulic pressure acting on the friction-engaging device before the engine is automatically stopped, the controller has a room for further improvement in fuel economy performance.

An object of the present invention, which was made in view of the circumstances, is to provide a vehicle control system capable of improving fuel economy performance.

Solution to Problem

In order to achieve the above mentioned object, a vehicle control system according to the present invention includes an internal combustion engine capable of switching an operating state and a non-operating state while a vehicle travels; an engaging device capable of switching an engaged state in which the internal combustion engine is engaged with the driving wheel so that a power can be transmitted therebetween and a release state in which the engagement is released; and a controller configured to control the internal combustion engine and the engaging device based on a vehicle speed parameter as to a traveling speed of the vehicle and a determination parameter different from the vehicle speed parameter, while the vehicle travels at deceleration, place the engaging device in a release state at the time stop permission conditions of the internal combustion engine as to the determination parameter have been established, and place the internal combustion engine in a non-operating state at the time the stop permission conditions of the internal combustion engine as to the vehicle speed parameter have been established.

Further, in the vehicle control system, it is possible to configure that the determination parameter is a parameter as to a load of an auxiliary machine that can be driven by a power from the internal combustion engine.

Further, in the vehicle control system, it is possible to configure that the determination parameter is a parameter corresponding to a charge state of a battery mounted on the vehicle, a temperature of a cooling medium for cooling the internal combustion engine, a temperature of an oil supplied to the vehicle, or a load of an air conditioning device mounted on the vehicle.

Further, in the vehicle control system, it is possible to configure that the engaging device can engage a rotating member on the internal combustion engine side and a rotating member on the driving wheel side so that a power can be transmitted therebetween and can adjust an engaging force for engaging the rotating member on the internal combustion engine side and the rotating member on the driving wheel side; and the controller changes the engaging force at the time the engaging device is released based on a deviation between an actual difference rotation speed between the rotating member on the internal combustion engine side and the rotating member on the driving wheel side at the time the internal combustion engine stop permission conditions as to the vehicle speed parameter have been established, and a determination difference rotation speed for determining that the engaging device is in the release state.

Further, in the vehicle control system, it is possible to configure that the controller reduces a release start beginning engaging force at the start beginning of the release of the engaging device based on an engaging force adjustment value according to the deviation between the actual difference rotation speed and the determination difference rotation speed.

Further, in the vehicle control system, it is possible to configure that at the time the internal combustion engine stop permission conditions as to the vehicle speed parameter have been established, the controller actually places the internal combustion engine in the non-operating state in the state in which the actual difference rotation speed is equal to or more than the determination difference rotation speed.

Advantageous Effects of Invention

The vehicle control system according to the present invention achieves effect that fuel economy performance can be improved.

DESCRIPTION OF EMBODIMENTS

An embodiment according to the present invention will be explained below in detail based on the drawings. Note that the present invention is by no means restricted by the embodiment. Further, the components in the embodiment include the components that can be replaced by a person skilled in the art and are easy or substantially the same components.

[First Embodiment]

Figure 1:
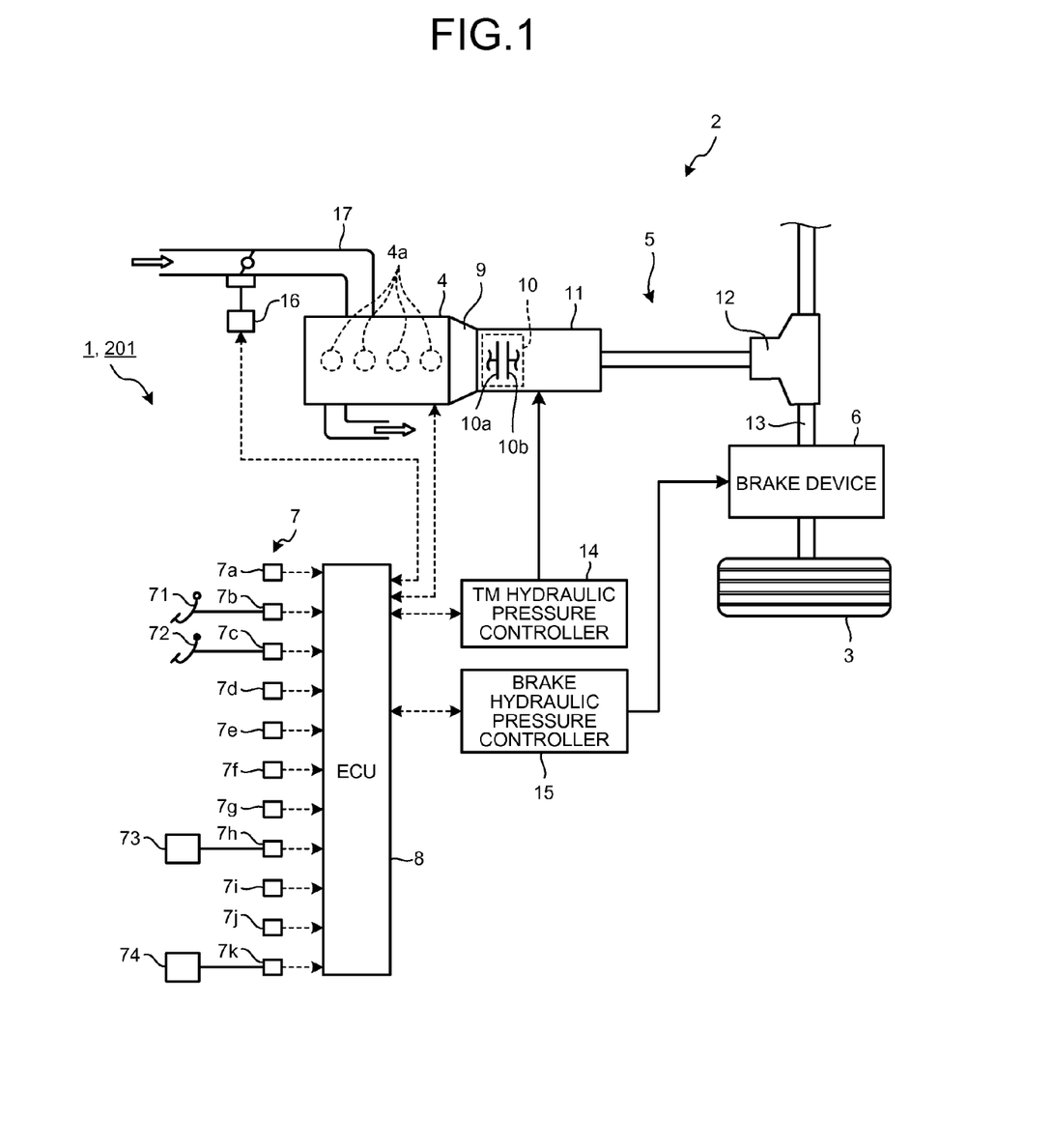
FIG. 1 is a schematic configuration view of a vehicle control system according to a first embodiment.
Figure 2:
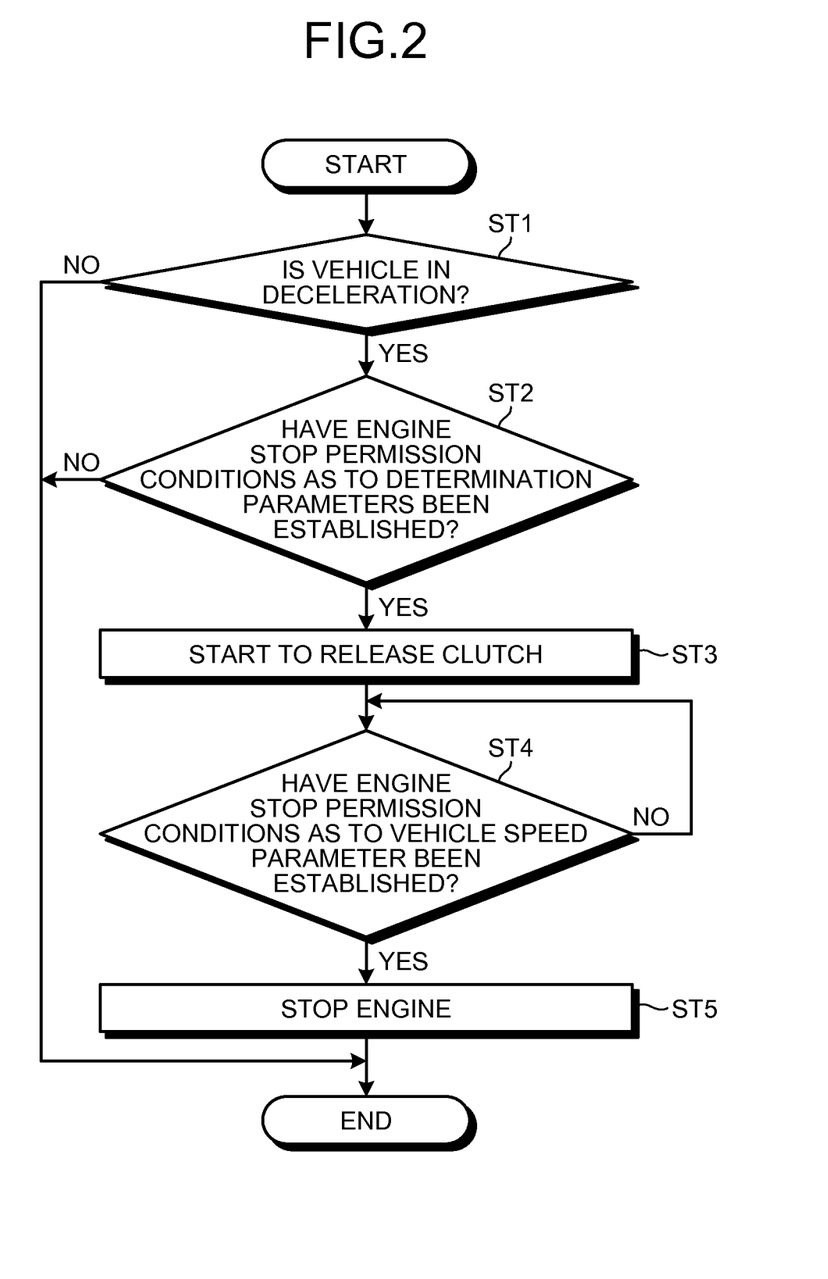
FIG. 2 is a flowchart explaining an example of the control of the vehicle control system according to the first embodiment.
Figure 3:
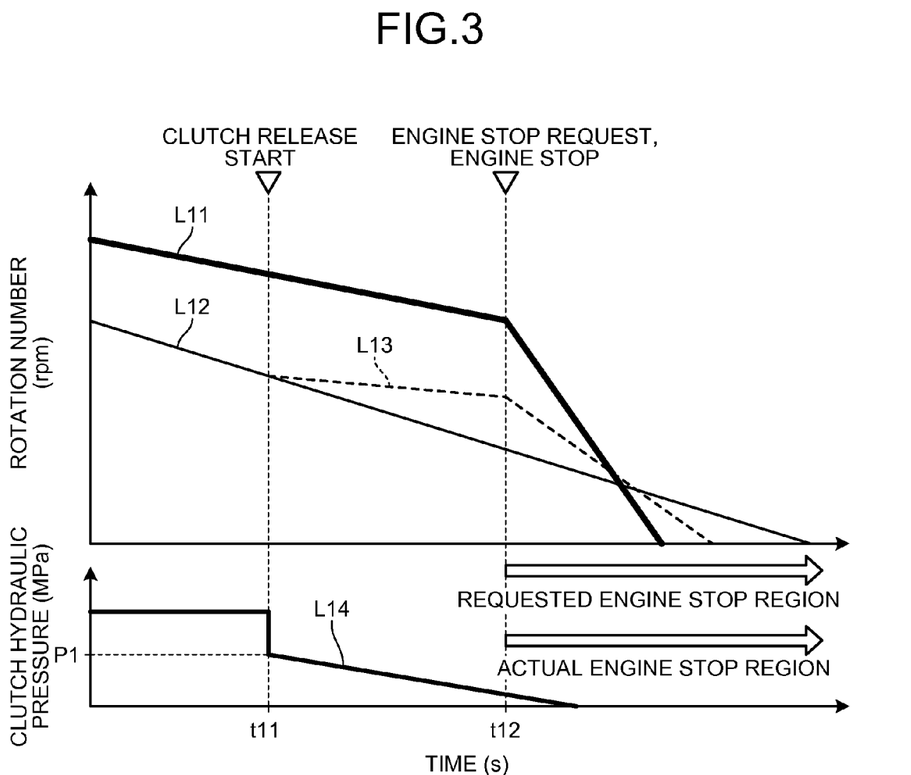
FIG. 3 is a time chart explaining an example of the operation of the vehicle control system according to the first embodiment.

FIG. 1 is a schematic configuration view of a vehicle control system according to a first embodiment, FIG. 2 is a flowchart explaining an example of the control in the vehicle control system according to the first embodiment, and FIG. 3 is a time chart explaining an example of the operation of the vehicle control system according to the first embodiment.

The vehicle control system according to the embodiment is applied to a vehicle and typically releases a clutch (engaging device) and stops an engine after the clutch has been released when an engine (internal combustion engine) stop request is issued while the vehicle travels to suppress the transmission of shock at the time the engine stops. At the time, in the vehicle control system, when the clutch starts to be released after the engine stop request has been generated, since a time is consumed until the clutch has been perfectly released and the stop of the engine is delayed with a prolonged operation time of the engine, there is a fear that a fuel economy improving effect achieved by the engine stop is reduced. In the vehicle control system of the embodiment, when engine stop permission conditions as to a determination parameter other than a vehicle speed parameter have been established while the vehicle travels at deceleration, the clutch is released before the actual engine stop request is generated, thereby improving the fuel economy performance by relatively reducing the engine operating time.

Specifically, as illustrated in FIG. 1, a vehicle control system 1 of the embodiment is applied to a vehicle 2. The vehicle control system 1 is a system for controlling respective portions of the vehicle 2. Further, the vehicle control system 1 is a system that can carry out S & S (stop & start) control for, for example, automatically stopping an engine 4 while the vehicle 2 travels and automatically restarting the vehicle 2 to thereby improve fuel economy by suppressing fuel economy using the inertia travel state of the vehicle 2 resulting from the S & S.

The vehicle control system 1 includes the engine 4 as an internal combustion engine for generating a power for drive a driving wheel 3, a power transmission device 5 constituting a power transmission system for transmitting the power generated by the engine 4 to the driving wheel 3, a brake device 6 as a braking device of the vehicle, a state detector 7 for detecting the state of the vehicle 2, and an ECU 8 as a controller for controlling respective portions of the vehicle 2 including the vehicle control system 1.

The engine 4 is a traveling drive source (a prime mover) for causing the vehicle 2 to travel. The engine 4 generates the power applied to the driving wheel 3 of the vehicle 2 as fuel is combusted in a combustion chamber 4a. The engine 4 can switch an operating state and a non-operating state while the vehicle 2 travels.

The operating state of the engine 4 (the state in which the engine 4 is operated) is the state in which the power to be applied to the driving wheel 3 is generated and the state in which the thermal energy generated by combusting the fuel in the combustion chamber 4a is output in the form of mechanical energy such as torque. Specifically, in the operating state, the engine 4 combusts the fuel in the combustion chamber 4a and generates the power to be applied to the driving wheel 3 of the vehicle 2.

In contrast, the non-operating state of the engine 4, that is, the state in which the operation of the engine 4 is stopped is the state in which the generation of the power is stopped and the state in which the supply of the fuel to the combustion chamber 4a is cut (a fuel cut), no fuel is combusted in the combustion chamber 4a, and the mechanical energy such as the torque is not output.

The power transmission device 5 is configured including a torque converter 9 as a fluid transmission device with a lock up clutch, a transmission 11 that is configured including a clutch 10 as an engaging device, changes the power from the engine 4, and outputs the changed power, a differential gear 12 coupled with the transmission 11, and a drive shaft 13 for coupling the differential gear 12 with the driving wheel 3. The power transmission device 5 can switch an engaged state in which the engine 4 is engaged with the driving wheel 3 by the clutch 10 so that the power can be transmitted and a release state in which the engagement therebetween is released.

The clutch 10 can use various clutches and controls the torque transmitted from the engine 4 to the driving wheel 3. The clutch 10 can switch the engaged state in which a rotating member 10a on the engine 4 side is engaged with a rotating member 10b on the driving wheel 3 side so that the power can be transmitted and the release state in which the engagement therebetween is released. Placing the clutch 10 in the engaged state couples the rotating member 10a with the rotating member 10b so that the power can be transmitted between the engine 4 and the driving wheel 3. In contrast, placing the clutch 10 in the release state isolates the rotating member 10a from the rotating member 10b so that the power transmission is cut off between the engine 4 and the driving wheel 3. The rotating member 10a on the engine 4 side corresponds to an output shaft of the torque converter 9 (a turbine shaft), and the rotating member 10b on the driving wheel 3 side corresponds to an input shaft of a main body portion of the transmission 11 (a transmission mechanism for actually carrying out a gear shift). Specifically, in the power transmission device 5, the output shaft of the torque converter 9 is connected to the input shaft of the main body portion of the transmission 11 via the clutch 10.

Further, the clutch 10 can adjust the engaging force for engaging the rotating member 10a on the engine 4 side with the rotating member 10b on the driving wheel 3 side. When the engaging force is 0, the clutch 10 is placed in the release state in which its engagement is released, and as the engaging force increases, the clutch 10 is placed in a perfectly engaged state via a semi-engaged state (slip state). As described later, the clutch 10 is a hydraulic device operated by a clutch hydraulic pressure that is the hydraulic pressure of the working fluid supplied from a TM hydraulic pressure controller 14. The clutch hydraulic pressure is the hydraulic pressure used to engage the rotating member 10a with the rotating member 10b by the clutch 10, and the engaging force for engaging the rotating member 10a with the rotating member 10b by the clutch 10 has a magnitude according to the clutch hydraulic pressure.

The transmission 11 is a so-called automatic transmission that automatically changes a gear ratio (gear shift stage) according to a traveling state of the vehicle 2. Various automatic transmissions, for example, a stepped automatic transmission (AT), a continuously variable automatic transmission (CVT), a multi-mode manual transmission (MMT), a sequential manual transmission (SMT), and a dual clutch transmission (DCT) are applied as the transmission 11. Here, for example, a belt-type CVT is applied as the transmission 11 and its operation is controlled by the ECU 8.

Note that although the explanation will be made here assuming that the clutch 10 described above is an input clutch disposed in front of the main body portion of the transmission 11, the clutch 10 is not limited thereto and the installation place thereof is not limited to the above-mentioned. When, for example, the transmission 11 is the AT transmission, the clutch 10 may be various clutches for realizing respective gear shift stages by the transmission 11.

The power generated by the engine 4 is input to the clutch 10 via the torque converter 9, is gear shifted at a predetermined gear ratio by the transmission 11 and transmitted to the driving wheel 3 via the differential gear 12 and the drive shaft 13. As a result, the vehicle 2 generates a driving force [N] on the ground plane of the driving wheel 3 in contact with a road surface and thereby the vehicle 2 can travel.

The brake device 6 applies a braking force to the wheels including the driving wheel 3. As a result, the vehicle 2 generates the braking force [N] on the ground plane of the driving wheel 3 in contact with the road surface so that the vehicle 2 can be braked.

The state detector 7 is electrically connected to the ECU 8 and they can mutually transmit and receive information such as a detection signal, a drive signal, and a control command. The state detector 7 includes various sensors and detectors disposed to respective portions of the vehicle 2 such as an engine speed sensor 7a, an accelerator opening degree sensor 7b, a brake sensor 7c, a vehicle speed sensor 7d, an acceleration/deceleration sensor 7e, a turbine rotation number sensor 7f, an input rotation number sensor 7g, a charged state detector 7h, a water temperature sensor 7i, an oil temperature sensor 7j, and a load detector 7k. The engine speed sensor 7a detects an engine speed (rotation speed) that is the rotation number (rotation speed) of the output shaft of the engine 4. The accelerator opening degree sensor 7b detects an accelerator opening degree that is the amount of operation of an accelerator pedal 71 operated by a driver (an accelerator operation amount). The brake sensor 7c detects the amount of operation of a brake pedal 72 operated by the driver, for example, detects a braking force by detecting a master cylinder pressure. The vehicle speed sensor 7d detects a vehicle speed that is the traveling speed of the vehicle 2. The acceleration/deceleration sensor 7e detects the acceleration/deceleration speed applied to a vehicle body of the vehicle 2. The turbine rotation number sensor 7f detects a turbine rotation number that is the rotation number (rotation speed) of the rotating member 10a. The turbine rotation number corresponds to the output rotation number from the torque converter 9. The input rotation number sensor 7g detects an input rotation number that is the rotation number (the rotation speed) of the rotating member 10b. The input rotation number corresponds to the input rotation number to the main body portion of the transmission 11 (for example, a primary sheave of the belt-type CVT). The charged state detector 7h detects a charged state SOC according to the storage capacity (the charged capacity) and the battery voltage of a battery 73 mounted on the vehicle 2. The water temperature sensor 7i detects a water temperature that is the temperature of cooling water as a cooling medium for cooling the engine 4. The oil temperature sensor 7j detects an oil temperature as the temperature of oil supplied to the vehicle 2 and used in the TM hydraulic pressure controller 14 and a brake hydraulic pressure controller 15 to be described later. The load detector 7k detects the load of an air conditioning device 74 (an air conditioner) mounted on the vehicle 2.

The ECU 8 is an electronic circuit mainly composed of a known microcomputer including a CPU, ROM, RAM, and an interface. The ECU 8 is input with an electric signal corresponding to the result of detection from the state detector 7 and controls the engine 4, the power transmission device 5 including the transmission 11, and the like, and the brake device 6 according to the input result of detection. The power transmission device 5 including the transmission 11, and the like, and the brake device 6 are hydraulic pressure type devices operated by the pressure (hydraulic pressure) of the working fluid as a medium, and the ECU 8 controls the operations of the transmission 11 and the brake device 6 via the TM hydraulic pressure controller 14 and the brake hydraulic pressure controller 15, respectively and controls, for example, the gear shift operation of the transmission 11 and the engagement/release operation of the clutch 10.

Further, the ECU 8 can detect the ON/OFF of an accelerator operation that is an acceleration requesting operation to the vehicle 2 by the driver based on, for example, the result of detection by the accelerator opening degree sensor 7b. Likewise, the ECU 8 can detect the ON/OFF of a brake operation that is a brake requesting operation to the vehicle 2 by the driver based on, for example, the result of detection by the brake sensor 7c.

The ECU 8 controls a throttle device 16 of the engine 4 basically based on, for example, the accelerator opening degree and the vehicle speed, adjusts the throttle opening degree of an intake air path 17, adjusts an inlet air amount, controls a fuel injection amount corresponding to the changes thereof, and adjusts the amount of an air-fuel mixture filled in the combustion chamber 4a, and controls the output of the engine 4 thereby. Further, the ECU 8 controls the TM hydraulic pressure controller 14 based on the accelerator opening degree and the vehicle speed and controls the operating state of the clutch 10 and the gear shift ratio of the transmission 11.

Further, while the vehicle 2 travels, the ECU 8 can switch the operating state and the non-operating state of the engine 4 by starting the engine 4 or stopping the operation thereof. While the vehicle 2 travels, the ECU 8 can carry out S & S control for automatically stopping the engine 4 and automatically restarting it. When the engine stop permission conditions for stopping the engine 4 (the stop permission conditions for stopping the engine 4) have been established while the vehicle 2 travels, the ECU 8 automatically stops the engine 4 by cutting the supply of fuel to the combustion chamber 4a of the engine 4 (fuel cut) and places the engine 4 in the non-operating state. Further, when, for example, an engine restart condition for restarting the engine 4 have been established at the time the engine 4 is placed in the non-operating state while the vehicle 2 travels, the ECU 8 restarts the engine 4 by returning the combustion chamber 4a from the fuel cut state and placing the engine 4 in the operating state. In the S & S control, the ECU 8 typically places the clutch 10 in the release state and causes the vehicle 2 to travel. With the operation, in the S & S control of the vehicle control system 1, the clutch 10 cuts off the power transmission between the driving wheel 3 and the engine 4 and no engine brake is exerted on the driving wheel 3. As a result, the vehicle control system 1 can achieve a fuel economy improving effect by suppressing the kinetic energy loss of the vehicle 2 caused by a traveling resistance as low as possible in addition to the fuel economy improving effect realized by stopping the supply of fuel to the engine 4.

The ECU 8 can carry out, for example, deceleration S & S control and free-run S & S control as the S & S control carried out while the vehicle 2 travels. The deceleration S & S control is carried out when the vehicle 2 travels at deceleration at a low speed equal to or less than a predetermined vehicle speed in, for example, the state in which the accelerator operation is released by the driver and a brake operation is carried out (the accelerator operation: OFF and the brake operation: ON). The free-run S & S control is carried out when the vehicle 2 travels at deceleration in, for example, the state in which any of the accelerator operation and the brake operation is released by the driver (the accelerator operation: OFF and the brake operation: OFF). Note that the free-run S & S control also has a vehicle speed upper limit at which the free-run S & S control can be carried out, and the free-run S & S control is basically carried out when the vehicle 2 travels at deceleration at a vehicle speed equal to or less than the vehicle speed upper limit.

In the S & S control, the ECU 8 of the embodiment controls the engine 4 and the clutch 10 based on a vehicle speed parameter as to a vehicle speed that is the traveling speed of the vehicle 2 and on a determination parameter different from the vehicle speed parameter. The ECU 8 settles the conditions of the parameters, and when the engine stop permission conditions as to all the parameters have been established, the engine 4 is actually stopped. Note that, in the following explanation, as an example, the case that the ECU 8 carries out the deceleration S & S control as the S & S control will be explained.

The vehicle speed parameter is the vehicle speed of the vehicle 2 or a parameter that makes an influence on the vehicle speed of the vehicle 2. Used as the vehicle speed parameter are any one or plural parameters corresponding to, for example, a vehicle speed detected by the vehicle speed sensor 7d, the deceleration detected by the acceleration/deceleration sensor 7e or the master cylinder pressure (the operation amount of the brake pedal 72) detected by the brake sensor 7c.

In contrast, the determination parameter is a parameter other than the vehicle speed parameter and is a parameter showing the state of the vehicle 2. The determination parameter is typically a parameter as to the load of an auxiliary machine that can be driven by the power from the engine 4. Used as the determination parameter is any one or plural of parameters corresponding to, for example, the charge state SOC of a battery 73 detected by the charged state detector 7h, the water temperature of cooling water detected by the water temperature sensor 7i, the oil temperature of oil detected by the oil temperature sensor 7j or the load of the air conditioning device 74 detected by the load detector 7k.

The ECU 8 of the embodiment can carry out a clutch release first-out control for placing the clutch 10 in the release state when the engine stop permission conditions as to the determination parameters have been established at the time the accelerator operation is turned OFF (specifically, the acceleration requesting operation is released) while the vehicle 2 travels at deceleration and for placing the engine 4 in the non-operating state when the engine stop permission conditions as to the vehicle speed parameter have been established. Specifically, when the determination parameter satisfies the engine stop permission conditions for stopping the engine 4, the ECU 8 places the clutch 10 in the release state, whereas when the vehicle speed parameter satisfies the engine stop permission conditions for stopping the engine 4, the ECU 8 actually places the engine 4 in the non-operating state. With the operation, since the vehicle control system 1 can stop the engine 4 at early timing, which can improve the fuel economy performance.

The engine stop permission conditions as to the determination parameters mean, for example, that the charge state SOC of the battery 73 detected by the charged state detector 7h, for example, a battery voltage and a charge amount are equal to or more than previously set predetermined values, the water temperature of the cooling water detected by the water temperature sensor 7i is equal to or less than a previously set predetermined water temperature, the oil temperature of the oil detected by the oil temperature sensor 7j is equal to or less than a previously set predetermined oil temperature, and the load of the air conditioning device 74 detected by the load detector 7k is equal to or less than a previously set predetermined load. It is sufficient to set the predetermined values, the predetermined water temperature, the predetermined oil temperature, and the predetermined load based on whether or not they are in the state in which it is necessary to operate a generator (for example, an alternator), an oil pump, a water pump, a compressor (compression device) of the air conditioning device 74 that are auxiliary machines driven by the power from the engine 4 based on an actual vehicle evaluation.

When any of the engine stop permission conditions as to the determination parameters being applied is not established, the ECU 8 prohibits to stop the engine 4. When it is estimated that the engine stop permission conditions as to the vehicle speed parameter are also established and the deceleration S & S control is carried out when all the engine stop permission conditions as to the determination parameters being applied have been established while a vehicle 2 travels at deceleration, specifically, when the vehicle 2 has been decelerated in the state and the vehicle speed has been reduced, the ECU 8 starts an operation for controlling the clutch 10 and placing it in the release state. Here, when all the engine stop permission conditions as to the determination parameters have been established, the ECU 8 controls the TM hydraulic pressure controller 14 and reduces the clutch hydraulic pressure supplied to the clutch 10 (pressure reduction). With the operation, the ECU 8 reduces the engaging force of the clutch 10, places the clutch 10 in the release state, isolates the rotating member 10a from the rotating member 10b and cuts off the power transmission between the engine 4 and the driving wheel 3. With the operation, the ECU 8 can place the clutch 10 in the release state prior to the actual stop control of the engine 4.

Note that, at the time, when the ECU 8 reduces the engaging force of the clutch 10 by reducing the clutch hydraulic pressure, after the ECU 8 gradually reduces the clutch hydraulic pressure at the beginning of release start to a predetermined hydraulic pressure by sweep control, the ECU 8 finally places the clutch 10 in a perfect release state. With the operation, the vehicle control system 1 can suppress the power transmission from being abruptly cut off when the clutch 10 is released and can suppress the generation of shock due to the abrupt cut-off of the power transmission.

In contrast, the engine stop permission conditions as to the vehicle speed parameter mean, for example, that the vehicle speed detected by the vehicle speed sensor 7d is equal to or less than a previously set predetermined vehicle speed, the absolute value of the deceleration detected by the acceleration/deceleration sensor 7e is equal to or more than a predetermined deceleration, and the master cylinder pressure (the operation amount of the brake pedal 72) detected by the brake sensor 7c is equal to or more than a predetermined pressure. It is sufficient to previously set the predetermined vehicle speed, the predetermined deceleration, and the predetermined pressure based on the specification of the vehicle 2 and the actual vehicle evaluation.

When all the engine stop permission conditions as to the vehicle speed parameter being applied have been established, the ECU 8 permits to stop the engine 4 and creates the engine stop request. The ECU 8 stops the engine 4 by cutting the supply of fuel to the combustion chamber 4a of the engine 4 and places the engine 4 in the non-operating state.

Note that when the accelerator operation is turned ON and when any of the engine stop permission conditions as to the determination parameters and the engine stop permission conditions as to the vehicle speed parameter is not established, specifically, when the engine restart conditions have been established, the ECU 8 places the engine 4 in the operating state by returning it from the fuel cut state and restarting the same and places the clutch 10 in the engaged state.

Next, an example of the control by the ECU 8 in the vehicle control system 1 will be explained referring to the flowchart of FIG. 2. Note that these control routines are repeatedly carried out at a control cycle of several milliseconds to several tens of milliseconds (this is the same as to the following explanations).

First, the ECU 8 determines whether or not the vehicle 2 is being decelerated (ST1). The ECU 8 determines whether or not the accelerator operation is turned OFF specifically, determines whether or not the acceleration requesting operation is released based on, for example, the accelerator opening degree detected by the accelerator opening degree sensor 7b and determines whether or not the vehicle 2 is being decelerated according to the determination. When the ECU 8 determines that the accelerator operation is turned ON and the vehicle 2 is not being decelerated (ST1: No), the ECU 8 finishes the control cycle of this time and shifts to a next control cycle.

When the ECU 8 determines that the accelerator operation is turned OFF and the vehicle 2 is being decelerated (ST1: Yes), the ECU 8 determines whether or not the engine stop permission conditions as to the determination parameters have been established (ST2). The ECU 8 determines whether or not all the engine stop permission conditions as to the determination parameters other than the vehicle speed parameter have been established based on, for example, the results of detection by the charged state detector 7h, the water temperature sensor 7i, the oil temperature sensor 7j, and the load detector 7k. When the ECU 8 determines that any of the engine stop permission conditions as to the determination parameters is not established (ST2: No), the ECU 8 finishes the control cycle of this time and shifts to a next control cycle.

When the ECU 8 determines that all the engine stop permission conditions as to the determination parameters have been established (ST2: Yes), the ECU 8 starts the operation for controlling the clutch 10 and placing it in the release state (ST3).

Next, the ECU 8 determines whether or not the engine stop permission conditions as to the vehicle speed parameter have been established (ST4). The ECU 8 determines whether or not all the engine stop permission conditions as to the vehicle speed parameter have been established based on, for example, the result of detections by the vehicle speed sensor 7d, the acceleration/deceleration sensor 7e, and the brake sensor 7c. When the ECU 8 determines that any of the engine stop permission conditions as to the vehicle speed parameter is not established (ST4: No), the ECU 8 repeatedly carries out the determination until it is determined that all the engine stop permission conditions as to the vehicle speed parameter have been established.

When the ECU 8 determines that all the engine stop permission conditions as to the vehicle speed parameter have been established (ST4: Yes), the ECU 8 places the engine 4 in the non-operating state by controlling and stopping it (ST5), finishes the control cycle of this time, and shifts to a next control cycle.

During the period, the ECU 8 also determines whether or not the engine restart conditions have been established in parallel, and when the engine restart conditions have been established, the ECU 8 returns the engine 4 to the operating state by restarting it and places the clutch 10 in the engaged state or keeps the engine 4 in the operating state and the clutch 10 in the engaged state as they are.

Next, an example of the operation of the vehicle control system 1 configured as described above will be explained referring to the time chart of FIG. 3. In FIG. 3, a horizontal axis illustrates a time axis and a vertical axis illustrates an engine speed, an input rotation number, a turbine rotation number, and a clutch hydraulic pressure. In FIG. 3, a solid line L11 illustrates the engine speed, a solid line L12 illustrates the input rotation number, a dotted line L13 illustrates the turbine rotation number, a solid line L14 illustrates the clutch hydraulic pressure. (This is the same as to FIG. 5 and FIG. 6 described below).

As exemplified in FIG. 3, the vehicle control system 1 configured as described above can start the operation for placing the clutch 10 in the release state at a time t11 at which the engine stop permission conditions as to the determination parameters other than the vehicle speed parameter have been established while the vehicle 2 travels at deceleration, before all the engine stop permission conditions are established and the engine stop request is generated. At the time, as illustrated in the solid line L14, the ECU 8 controls the TM hydraulic pressure controller 14 at the time t11 at which the engine stop permission conditions as to the determination parameters have been established and reduces the clutch hydraulic pressure up to a previously set release start beginning hydraulic pressure P1, thereby reducing the engaging force up to a release start beginning engaging force. Thereafter, the ECU 8 gradually reduces the clutch hydraulic pressure by the sweep control and finally places the clutch 10 in the perfect release state. With the operation, the vehicle control system 1 can suppress the shock from being generated by the abrupt cut-off of the power transmission.

In the vehicle control system 1, at a time t12 at which the engine stop permission conditions as to the vehicle speed parameter have been established and the engine stop request has been actually generated, the difference rotation number between the input rotation number and the turbine rotation number becomes equal to or more than a predetermined rotation number, specifically, the clutch 10 is placed in the release state and the driving wheel 3 is isolated from the engine 4 as illustrated in the solid line L12 and the dotted line L13. Thus, in the vehicle control system 1, even if the engine 4 is instantly stopped just after the engine stop request has been generated at the t12, the transmission of shock to the driving wheel 3 side when the engine 4 is stopped can be suppressed so that the generation of shock can be suppressed.

As a result, since the vehicle control system 1 can previously release the clutch 10 before the engine stop permission conditions of the vehicle speed parameter have been established and the engine stop request is actually generated, when the engine stop request has been generated, the vehicle control system 1 can stop the engine 4 early without waiting for the release operation of the clutch 10. As illustrated in the solid line L11, in the vehicle control system 1, the engine speed is reduced thereby. Specifically, at the time at which, for example, the vehicle 2 is decelerated and the vehicle speed becomes a predetermined vehicle speed (an engine stop vehicle speed) which permits to stop the engine 4, the vehicle control system 1 can instantly stop the engine 4 and places it in the non-operating state. Thus, the vehicle control system 1 can relatively reduce an engine operation time, cause an actual engine stop region to approximately agree with a requested engine stop region, reduce an excessive fuel consumption amount, and improve the fuel economy. As a result, the vehicle control system 1 can obtain a further fuel economy improving effect and realize the suppression of shock when the engine stops and the improvement of the fuel economy performance at the same time.

Further, in other words, even if the vehicle control system 1 carries out the control for suppressing the generation of shock due to the abrupt cut-off of the power transmission by the sweep control described above, since the vehicle control system 1 can release the clutch 10 before the engine stop request is generated, it can instantly stop the engine 4 at the time the engine stop request is actually generated. Also in this point, the vehicle control system 1 can realize the suppression of shock when the engine stops and the improvement of the fuel economy performance at the same time.

Note that the stop permission conditions of the engine 4 as to the vehicle speed parameter have been established, the ECU 8 may carry out the control for determining and confirming that the clutch 10 has been in the perfect release state based on the actual difference rotation number (the difference rotation speed) between the rotating member 10*a* and the rotating member 10*b* and further actually placing the engine 4 in the non-operating state. In the case, the ECU 8 calculates the actual difference rotation number between the turbine rotation number detected by the turbine rotation number sensor 7*f* and the input rotation number detected by the input rotation number sensor 7*g*. In the state in which the actual difference rotation speed is equal to or more than a previously set release determination difference rotation number (a determination difference rotation speed), the ECU 8 preferably carries out the control for actually placing the engine 4 in the non-operating state. The release determination difference rotation number is a difference rotation number for determining that the clutch 10 is in the release state. In the case, since the vehicle control system 1 can stop the engine 4 after having confirmed that the clutch 10 is certainly in the release state, the shock when the engine stops can be certainly suppressed.

The vehicle control system 1 according to the embodiment explained above includes the engine 4, the clutch 10, and the ECU 8. The engine 4 can be switched to the operating state and the non-operating state while the vehicle 2 travels. The clutch 10 can switch the engine 4 and the driving wheel 3 to the engaged state in which the power can be transmitted therebetween and to the release state in which the engagement therebetween is released. The ECU 8 controls the engine 4 and the clutch 10 based on the vehicle speed parameter as to the traveling speed of the vehicle 2 and the determination parameter different from the vehicle speed parameter. When the stop permission conditions of the engine 4 as to the determination parameters have been established while the vehicle 2 travels at deceleration, the ECU 8 places the clutch 10 in the release state, whereas when the stop permission conditions of the engine 4 as to the vehicle speed parameter have been established, the ECU 8 places the engine 4 in the non-operating state.

Thus, when the engine stop request is actually generated at the time the engine stop permission conditions of the vehicle speed parameter have been established, since the vehicle control system 1 can stop the engine 4 early without waiting for the release operation of the clutch 10, the engine operation time can be relatively reduced and the fuel economy performance can be improved. As a result, the vehicle control system 1 can realize the suppression of shock when the engine stops and the improvement of the fuel economy performance at the same time.

[Second Embodiment]

Figure 4:
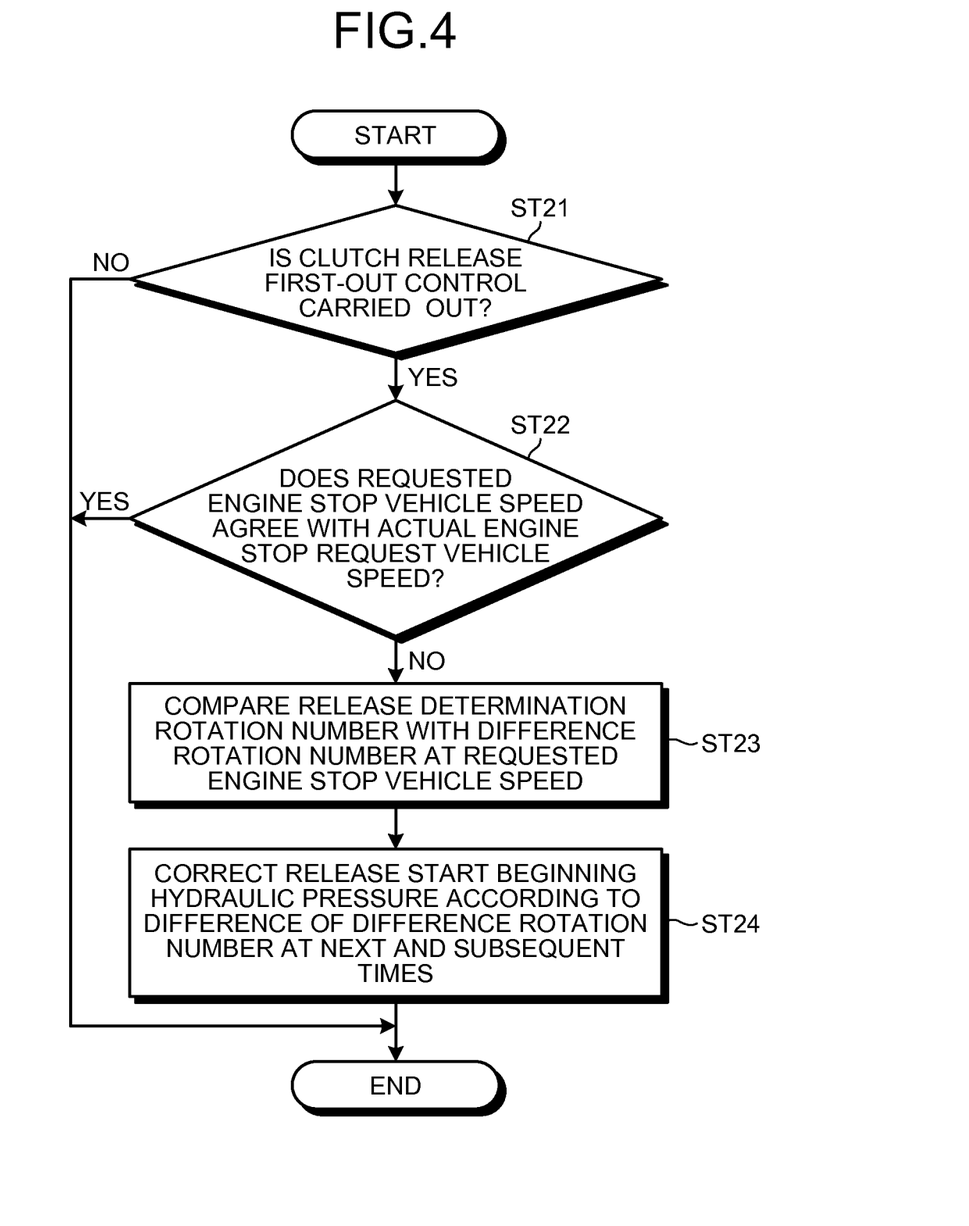
FIG. 4 is a flowchart explaining an example of the control of a vehicle control system according to a second embodiment.
Figure 5:
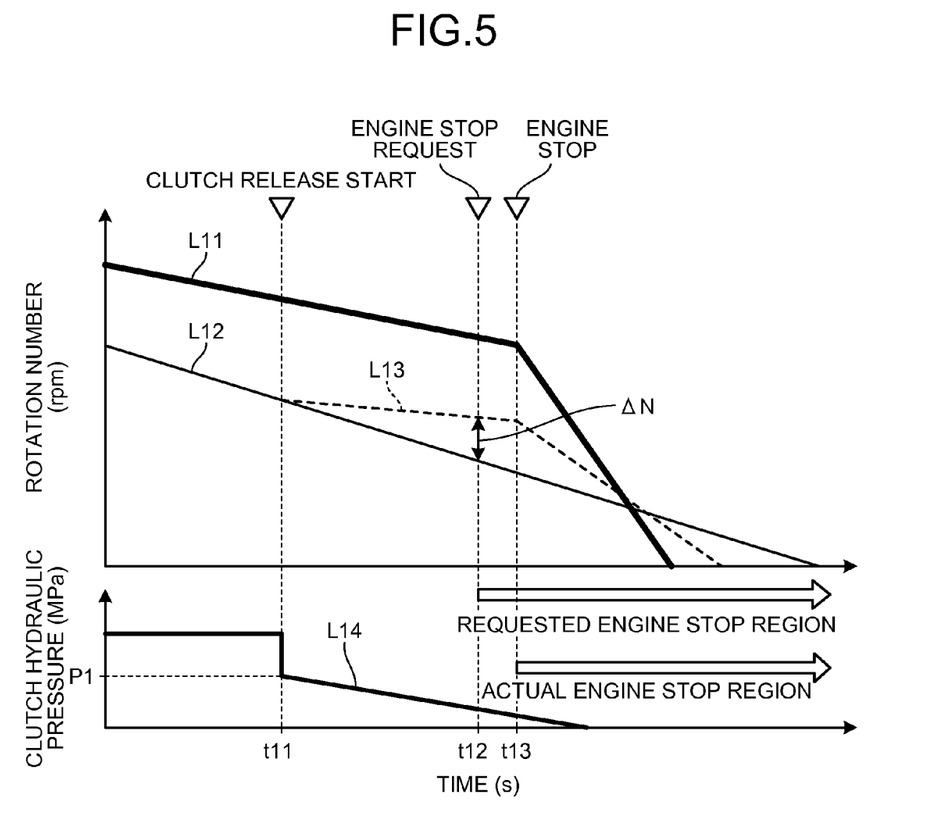
FIG. 5 is a time chart explaining an example of the operation of the vehicle control system according to the second embodiment.
Figure 6:
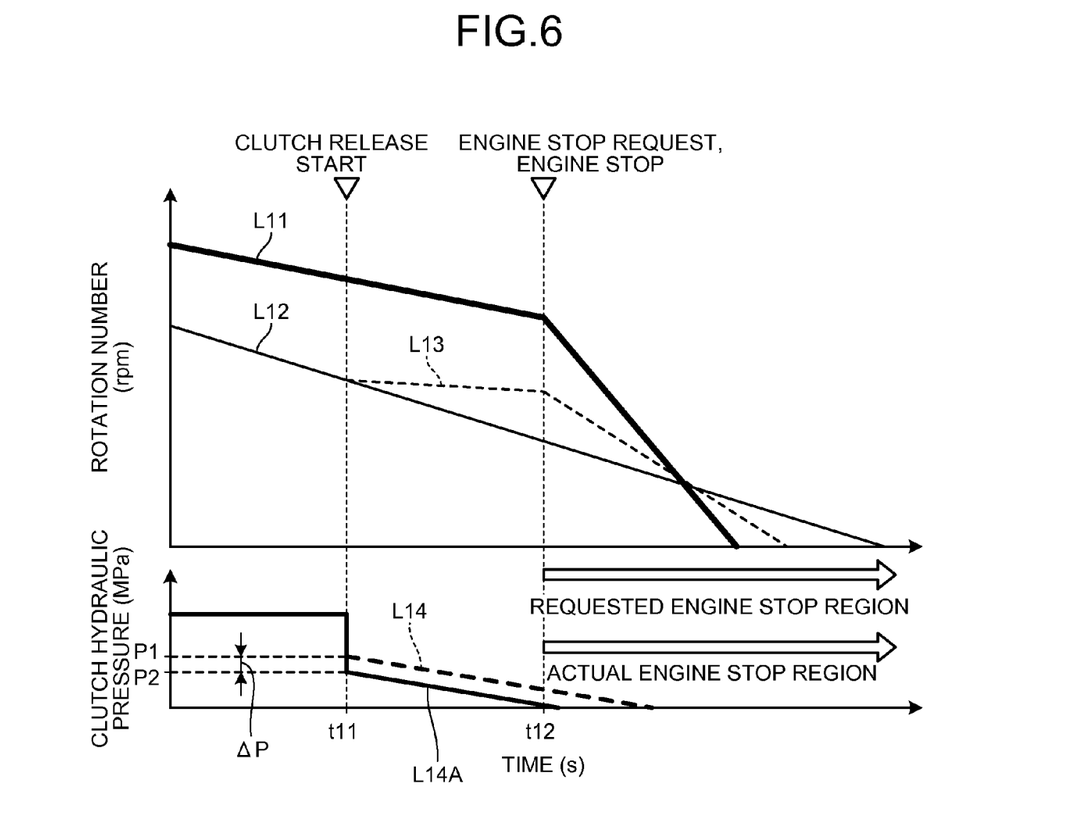
FIG. 6 is a time chart explaining an example of the operation of the vehicle control system according to the second embodiment.

FIG. 4 is a flowchart explaining an example of the control in a vehicle control system according to a second embodiment, and FIG. 5 and FIG. 6 are time charts explaining an example of the operation of the vehicle control system according to the second embodiment. The vehicle control system according to the second embodiment is different from the first embodiment in that an engaging force when an engaging device is placed in a release state is made variable. Except the point described above, duplicate explanation of the configuration, the operation, and the effect that are common to the embodiment described above will be omitted as far as possible. Further, FIG. 1 and the like will be referred to as to the respective configurations of the vehicle control system according to the second embodiment.

A vehicle control system 201 according to the embodiment changes the engaging force when a clutch 10 is placed in a release state based on the deviation between the actual difference rotation number between a rotating member 10*a* on an engine 4 side and a rotating member 10*b* on a driving wheel 3 side when engine stop permission conditions as to a vehicle speed parameter have been established and the determination difference rotation number for determining that the clutch 10 is in the release state.

As described above, an ECU 8 calculates the actual difference rotation number between the turbine rotation number detected by a turbine rotation number sensor 7*f* and the input rotation number detected by an input rotation number sensor 7*g* and can confirm that the clutch 10 is in a perfectly released state based on the actual difference rotation number. Specifically, when the ECU 8 determines that the actual difference rotation number between the turbine rotation number and the input rotation number is equal to or more than a release determination difference rotation number, the ECU 8 can determine that the clutch 10 is in the perfectly released state.

The vehicle control system 201 may cause the dispersion of machine differences depending on, for example, the dispersion of respective parts (for example, the dispersion of various pack clearances and the dispersion of various return spring set loads) and aged degradation. In the case, when the vehicle control system 201 releases the clutch 10 using at all times, for example, the release start beginning hydraulic pressure having a fixed value and a pressure reducing gradient that are previously set, there is a fear that the clutch 10 cannot be sufficiently released due to the dispersion of the machine differences and the like when the engine stop permission conditions as to the vehicle speed parameter have been established. Specifically, in the case, the vehicle control system 201 has a fear that the clutch 10 cannot be sufficiently released at the time an engine stop request is generated and the engine 4 cannot be stopped at once when the engine stop request is generated.

In contrast, the ECU 8 of the embodiment compensates the dispersion based on a difference rotation number deviation at the time of generation of stop request. The difference rotation number deviation at the time of generation of stop request is the deviation between the actual difference rotation number between the turbine rotation number and the input rotation number at the time the engine stop permission conditions as to the vehicle speed parameter have been established, specifically, at the time the engine stop request has been generated and the release determination difference rotation number. When a requested engine stop vehicle speed does not agree with an actual engine stop vehicle speed (specifically the former is different from the latter), in other words, when the actual difference rotation number at the time the engine stop request has been generated is less than the release determination difference rotation number, the ECU 8 studies dispersion based on the difference rotation number deviation at the time of generation of stop request and makes the engaging force when the clutch 10 is released variable. Specifically, when an actual engine stop region does not agree with a requested engine stop region, the ECU 8 makes the clutch hydraulic pressure when the clutch 10 is released variable based on the difference rotation number deviation at the time of generation of stop request and makes the engaging force variable. Note that the requested engine stop vehicle speed is a vehicle speed when the engine stop permission conditions as to the vehicle speed parameter have been established and the engine stop request has been generated. Further, the actual engine stop vehicle speed is a vehicle speed when it is confirmed that the clutch 10 has been released based on the actual difference rotation number and the release determination difference rotation number and when the engine 4 has actually stopped.

The ECU 8 calculates an engaging force adjustment value (a learning value) according to the difference rotation number deviation at the time of generation of stop request that is the deviation between the actual difference rotation speed and the determination difference rotation speed, reduces the release start beginning hydraulic pressure at the beginning of start at which the clutch 10 is released based on the engaging force adjustment value, and reduces a release start beginning engaging force. When the requested engine stop vehicle speed does not agree with the actual engine stop vehicle speed as described above although, for example, clutch release first-out control is carried out, the ECU 8 uses the hydraulic pressure that is obtained by subtracting the hydraulic pressure according to the engaging force adjustment value from the release start beginning hydraulic pressure of this time as the release start beginning hydraulic pressure in the clutch release first-out control carried out next and thereafter. In the case, the relation between the difference rotation number deviation at the time of generation of stop request and the engaging force adjustment value is previously formed in a map as an engaging force adjustment value map based on, for example, an actual vehicle evaluation and the like and stored in a storage section of the ECU 8. The ECU 8 calculates the engaging force adjustment value from the difference rotation number deviation at the time of generation of stop request based on the engaging force adjustment value map. Note that the relation between the difference rotation number deviation at the time of generation of stop request and the engaging force adjustment value may be stored in the storage section as a mathematical expression model in place of the engaging force adjustment value map.

Next, an example of the control by the ECU 8 in the vehicle control system 201 will be explained referring to the flowchart of FIG. 4.

First, the ECU 8 determines whether or not the clutch release first-out control has been carried out in which the clutch 10 is placed in the release state when engine stop permission conditions as to determination parameters have been established while the vehicle 2 travels at deceleration, whereas the engine 4 is placed in a non-operating state when the engine stop permission conditions as to the vehicle speed parameter have been established (ST21). When the ECU 8 determines that the clutch release first-out control is not carried out (ST21: No), the ECU 8 finishes the control cycle of this time and shifts to a next control cycle.

When the ECU 8 determines that the clutch release first-out control is carried out (ST21: Yes), the ECU 8 determines whether or not the requested engine stop vehicle speed agrees with the actual engine stop vehicle speed in the clutch release first-out control (ST22). the ECU 8 compares the vehicle speed when the engine stop permission conditions as to the vehicle speed parameter have been established and the engine stop request has been generated with the vehicle speed when the engine 4 has actually stopped based on, for example, the result of detection by a vehicle speed sensor 7d, thereby determining whether or not the requested engine stop vehicle speed agrees with vehicle speed when the engine has actually stopped. Note that the ECU 8 is by no means limited to the above-mentioned and may determine whether or not the requested engine stop vehicle speed agrees with the actual engine stop vehicle speed based on, for example, the difference between the actual difference rotation number between the turbine rotation number and the input rotation number at the time the engine stop request is generated and the release determination difference rotation number. In the case, when the actual difference rotation number is less than the release determination difference rotation number at the time the engine stop request is generated, the ECU 8 can determine that the requested engine stop vehicle speed does not agrees with the actual engine stop vehicle speed. When the ECU 8 determines that the requested engine stop vehicle speed agrees with the actual engine stop vehicle speed (ST22: Yes), the ECU 8 finishes the control cycle of this time and shifts to a next control cycle.

When the ECU 8 determines that the requested engine stop vehicle speed does not agree with the actual engine stop vehicle speed, specifically, the ECU 8 determines that the requested engine stop vehicle speed is different from the actual engine stop vehicle speed (ST22: No), the ECU 8 calculates the actual difference rotation number between the turbine rotation number detected by a turbine rotation number sensor 7f and the input rotation number detected by an input rotation number sensor 7g when the engine stop permission conditions have been established and the engine stop request is generated. The ECU 8 compares the release determination difference rotation number with the actual difference rotation number at the requested engine stop vehicle speed and calculates the difference between the release determination difference rotation number and the actual difference rotation number as the difference rotation number deviation at the time of generation of stop request (ST23).

The ECU 8 corrects the release start beginning hydraulic pressure according to the difference between the release determination difference rotation number and the actual difference rotation number, which is calculated as the difference rotation number deviation at the time of generation of stop request, by next and subsequent clutch release first-out control (ST24), and finishes the control cycle of this time and shifts to a next control cycle. In the case, the ECU 8 calculates the engaging force adjustment value (the learning value) from the difference between the release determination difference rotation number, which is calculated as the difference rotation number deviation at the time of generation of stop request, and the actual difference rotation number based on the engaging force adjustment value map. The ECU 8 subtracts the hydraulic pressure according to the engaging force adjustment value from the release start beginning hydraulic pressure in the clutch release first-out control of this time and uses the release start beginning hydraulic pressure after the subtraction as the release start beginning hydraulic pressure in the next and subsequent clutch release first-out control.

Next, an example of the operation of the vehicle control system 201 configured as described above will be explained referring to the time charts of FIG. 5 and FIG. 6.

As exemplified in FIG. 5, the vehicle control system 201 configured as described above starts an operation for placing the clutch 10 in the release state at a time t11 at which the engine stop permission conditions as to the determination parameters have been established. At the time, as illustrated by a solid line L14, the ECU 8 controls a TM hydraulic pressure controller 14 at the time t11 and reduces the clutch hydraulic pressure up to the release start beginning hydraulic pressure P1, thereby reducing the engaging force up to the release start beginning engaging force. Thereafter, the ECU 8 gradually reduces the clutch hydraulic pressure by sweep control and finally places the clutch 10 in the perfect release state. In the vehicle control system 201, the engine stop request is actually generated at a time t12 at which the engine stop permission conditions as to the vehicle speed parameter have been established.

At the time, when, for example, the actual difference rotation number ΔN between the input rotation number and the turbine rotation number is less than the release determination difference rotation number due to the dispersion of the machine differences at the time t12, specifically, when the clutch 10 is not yet sufficiently released, the vehicle control system 201 cannot stop the engine 4 at the time t12 and can finally stop the engine 4 at a time t13 at which the clutch 10 is sufficiently engaged after a predetermined time has passed. In the case, the vehicle control system 201 cannot stop the engine 4 at once at the time the engine stop request is generated, the requested engine stop vehicle speed does not agree with the actual engine stop vehicle speed, and the actual engine stop region becomes relatively narrow to the requested engine stop region.

When the requested engine stop vehicle speed does not agree with the actual engine stop vehicle speed and the actual engine stop region becomes relatively narrow to the requested engine stop region as described above, the vehicle control system 201 calculates the difference rotation number deviation at the time of generation of stop request by obtaining the difference between the actual difference rotation number ΔN and the release determination difference rotation number and calculates the engaging force adjustment value according to the difference rotation number deviation at the time of generation of stop request. As exemplified in FIG. 6, the vehicle control system 201 uses the hydraulic pressure, which is obtained by subtracting the hydraulic pressure ΔP according to the engaging force adjustment value from the release start beginning hydraulic pressure P1 in the clutch release first-out control of this time, as a release start beginning hydraulic pressure P2 in the next and subsequent clutch release first-out control.

As a result, as illustrated in a solid line L14A in FIG. 6, since the vehicle control system 201 releases the clutch 10 using the release start beginning hydraulic pressure P2 in the next and subsequent clutch release first-out control, when the engine stop permission conditions as to the vehicle speed parameter have been established, the vehicle control system 201 can place the clutch 10 in a sufficiently released state regardless the dispersion of the machine differences. Specifically, the vehicle control system 201 can complete the release of the clutch 10 before the vehicle 2 becomes the requested engine stop vehicle speed. With the operation, the vehicle control system 201 can stop the engine 4 at once at the time t12 at which the engine stop request is generated. Thus, since the vehicle control system 201 can stop the engine 4 at once at the time the engine stop request is generated regardless the dispersion of the machine differences, the vehicle control system 201 can cause the requested engine stop vehicle speed to agree with the actual engine stop vehicle speed so as to cause the requested engine stop region to agree with the actual engine stop region. Thus, the vehicle control system 201 can relatively reduce an engine operation time to cope with the dispersion of the machine differences so that fuel economy performance can be certainly improved.

Note that although the above explanation has been made assuming that the ECU 8 reduces the release start beginning hydraulic pressure based on the engaging force adjustment value according to the difference rotation number deviation at the time of generation of stop request and reduces the release start beginning engaging force, the embodiment is by no means limited thereto. The ECU 8 may make the clutch hydraulic pressure variable when the clutch 10 is released by increasing the pressure reducing gradient of the clutch hydraulic pressure in the sweep control and makes the engaging force variable in the range in which no shock is generated by abruptly cutting off the power transmission based on the difference rotation number deviation at the time of generation of stop request.

When the engine stop permission conditions of the vehicle speed parameter have been established and the engine stop request has been actually generated, since the vehicle control system 201 according to the embodiment explained above can early stop the engine 4 without waiting for the release operation of the clutch 10, the vehicle control system 201 can relatively reduce the engine operation time and improve the fuel economy performance. As a result, the vehicle control system 1 can suppress shock when the engine stops and improve the fuel economy performance at the same time.

Further, according to the vehicle control system 201 according to the embodiment, the clutch 10 can engage the rotating member 10a on the engine 4 side with the rotating member 10b on the driving wheel 3 side so that the power can be transmitted therebetween and can adjust the engaging force for engaging the rotating member 10a on the engine 4 side with the rotating member 10b on the driving wheel 3 side. The ECU 8 changes the engaging force when the clutch 10 is placed in the release state based the deviation between the actual difference rotation speed between the rotating member 10a on the engine 4 side and the rotating member 10b on the driving wheel 3 side when the stop permission conditions of the engine 4 as to the vehicle speed parameter have been established and the determination difference rotation speed for determining that the clutch 10 is in the release state. The ECU 8 reduces the release start beginning engaging force at the beginning of start of the release of the clutch 10 based on the engaging force adjustment value according to the deviation between the actual difference rotation speed and the determination difference rotation speed.

Thus, the vehicle control system 201 according to the embodiment can place the clutch 10 in the sufficiently released state when the engine stop permission conditions as to the vehicle speed parameter have been established regardless the dispersion of the machine differences according to, for example, the dispersion of the respective parts and the aged degradation and can stop the engine 4 at once when the engine stop request has been generated. As a result, the vehicle control system 201 can more certainly improve the fuel economy performance.

Note that the vehicle control system 201 according to the embodiment described above is by no means restricted to above embodiments and can be variously modified within the scope described in the claims.

The clutch release first-out control explained above is not limited to the time at which the deceleration S & S is carried out and can be carried out when the S & S including free run S & S control is carried out.

The vehicle explained above may be a so-called "hybrid vehicle" provided with a motor generator as an electric motor capable of generating an electric power in addition of the engine 4 as a travelling power source.

REFERENCE SIGNS LIST 1, 201 vehicle control system
2 vehicle
3 driving wheel
4 engine (internal combustion engine)
5 power transmission device
6 brake device
7 state detector
8 ECU (controller)
9 torque converter
10 clutch (engaging device)
10a, 10b rotating member
11 transmission
12 differential gear
13 drive shaft
14 TM hydraulic pressure controller
15 brake hydraulic pressure controller
16 throttle device
17 intake air path
71 accelerator pedal
72 brake pedal
73 battery
74 air conditioning device

The invention claimed is:
1. A vehicle control system comprising:
an internal combustion engine capable of switching an operating state and a non-operating state thereof while a vehicle travels;
an engaging device configured to switch an engaged state in which the internal combustion engine is engaged with a driving wheel so that a power can be transmitted therebetween and a release state in which the engagement is released; and
a controller configured to control the internal combustion engine and the engaging device based on a vehicle speed parameter as to a traveling speed of the vehicle and a determination parameter different from the vehicle speed parameter, while the vehicle travels at deceleration, place the engaging device in the release state at the time stop permission conditions of the internal combustion engine as to the determination parameter have been established and before an internal combustion engine stop request is generated, and place the internal combustion engine in a non-operating state at the time the stop permission conditions of the internal combustion engine as to the vehicle speed parameter have been established and the internal combustion engine stop request has been generated wherein
the engaging device can engage a rotating member on an internal combustion engine side and a rotating member on a driving wheel side so that a power can be transmitted therebetween and can adjust an engaging force for engaging the rotating member on the internal combustion engine side and the rotating member on the driving wheel side; and
the controller changes the engaging force at the time the engaging device is released based on a deviation between an actual difference rotation speed between the rotating member on the internal combustion engine side and the rotating member on the driving wheel side at the time the internal combustion engine stop permission conditions as to the vehicle speed parameter have been established, and a determination difference rotation speed for determining that the engaging device is in the release state.

2. The vehicle control system according to claim 1, wherein
the determination parameter is a parameter as to a load of an auxiliary machine that can be driven by a power from the internal combustion engine.

3. The vehicle control system according to claim 2, wherein
the determination parameter is a parameter corresponding to a charge state of a battery mounted on the vehicle, a temperature of a cooling medium for cooling the internal combustion engine, a temperature of an oil supplied to the vehicle, or a load of an air conditioning device mounted on the vehicle.

4. The vehicle control system according to claim 1, wherein
the determination parameter is a parameter corresponding to a charge state of a battery mounted on the vehicle, a temperature of a cooling medium for cooling the internal combustion engine, a temperature of an oil supplied to the vehicle, or a load of an air conditioning device mounted on the vehicle.

5. The vehicle control system according to claim 1, wherein
the controller reduces a release start beginning engaging force at the start beginning of the release of the engaging device based on an engaging force adjustment value according to the deviation between the actual difference rotation speed and the determination difference rotation speed.

6. The vehicle control system according to claim 5, wherein
at the time the internal combustion engine stop permission conditions as to the vehicle speed parameter have been established, the controller actually places the internal combustion engine in the non-operating state in the state in which the actual difference rotation speed is equal to or more than the determination difference rotation speed.

7. The vehicle control system according to claim 1, wherein
at the time the internal combustion engine stop permission conditions as to the vehicle speed parameter have been established, the controller actually places the internal combustion engine in the non-operating state in the state in which the actual difference rotation speed is equal to or more than the determination difference rotation speed.

* * * * *